Jan. 3, 1956 R. G. HESTER 2,729,809

POLARITY SELECTOR

Filed Jan. 22, 1953 3 Sheets-Sheet 1

INVENTOR.
Robert G. Hester
BY
Roland A. Anderson
ATTORNEY

Jan. 3, 1956 R. G. HESTER 2,729,809

POLARITY SELECTOR

Filed Jan. 22, 1953 3 Sheets-Sheet 2

INVENTOR.
Robert G. Hester
BY
Roland A. Anderson
ATTORNEY

INVENTOR.
Robert G. Hester
BY
Roland A. Anderson
ATTORNEY

United States Patent Office 2,729,809
Patented Jan. 3, 1956

2,729,809

POLARITY SELECTOR

Robert G. Hester, Redondo Beach, Calif., assignor to the United States of America as represented by the United States Atomic Energy Commission Application January 22, 1953, Serial No. 332,648

4 Claims. (Cl. 340—174)

The present invention relates to electrical circuits and more especially to a polarity selector adapted to receive electrical signals and to distinguish between those which are initially positive-going and those which are initially negative-going.

In many fields of electronic instrumentation, it is required to sort events represented by electrical impulses into one of two alternative groups. For example, the events may be represented by positive and negative electrical pulses, or by roughly sinusoidal signals 180° out of phase. The sorting circuit must be able to receive signals of either initial polarity and to produce an output signal indicative of the type of signal received. In electronic computers, binary numbers may be represented by positive or negative magnetization of the recording medium, which may be wire, a drum, or magnetic tape. In order to recover a number written or stored in such magnetic memory system, the medium may be scanned by a pick-up head. The voltage induced in the winding of that head by the recorded information may be amplified and impressed upon a polarity selector circuit which must produce a binary signal responsive thereto. In many applications it is desired that a first signal be produced for each bit of information read by the magnetic head, and that a second pulse be produced if the bit of information represents one binary character, but no second pulse be produced if the bit of information represents the other binary character.

Accordingly, it is a primary object of my invention to provide means for scanning a record medium and producing binary electrical signals in accordance with the binary recorded information, and means for differentiating between the character of the signals produced.

An important object of my invention is to provide a circuit adapted to receive binary electricad signals of either character and to produce an output signal indicative of the binary character of the input signal.

A further object of my invention is to receive signals comprising two associated pulses of opposite polarity and to deliver a first pulse output corresponding to each input signal and a second pulse output corresponding to each input signal in which the first pulse of the two is of a selected polarity.

Figures 1, 2:
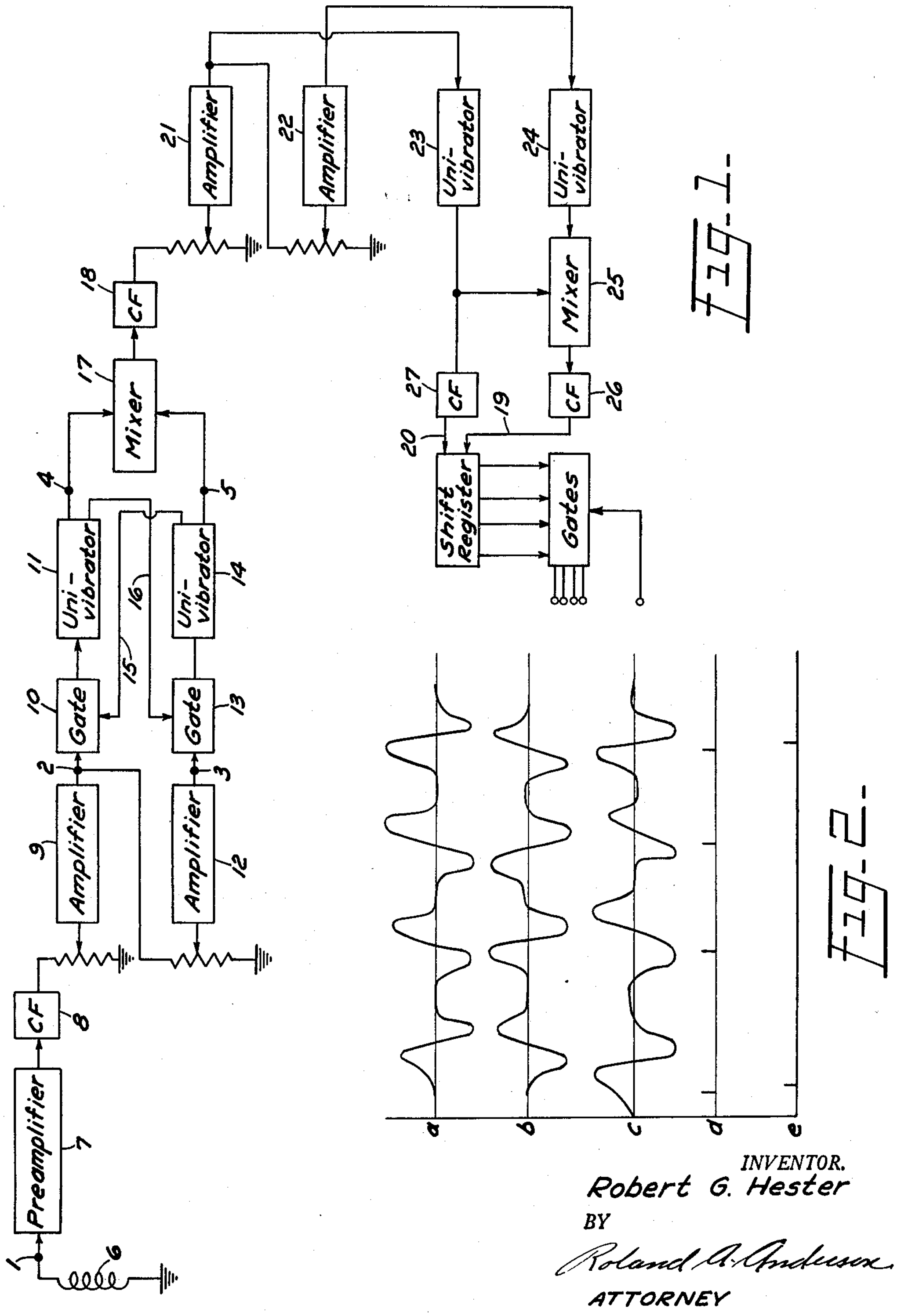
Figure 3D:
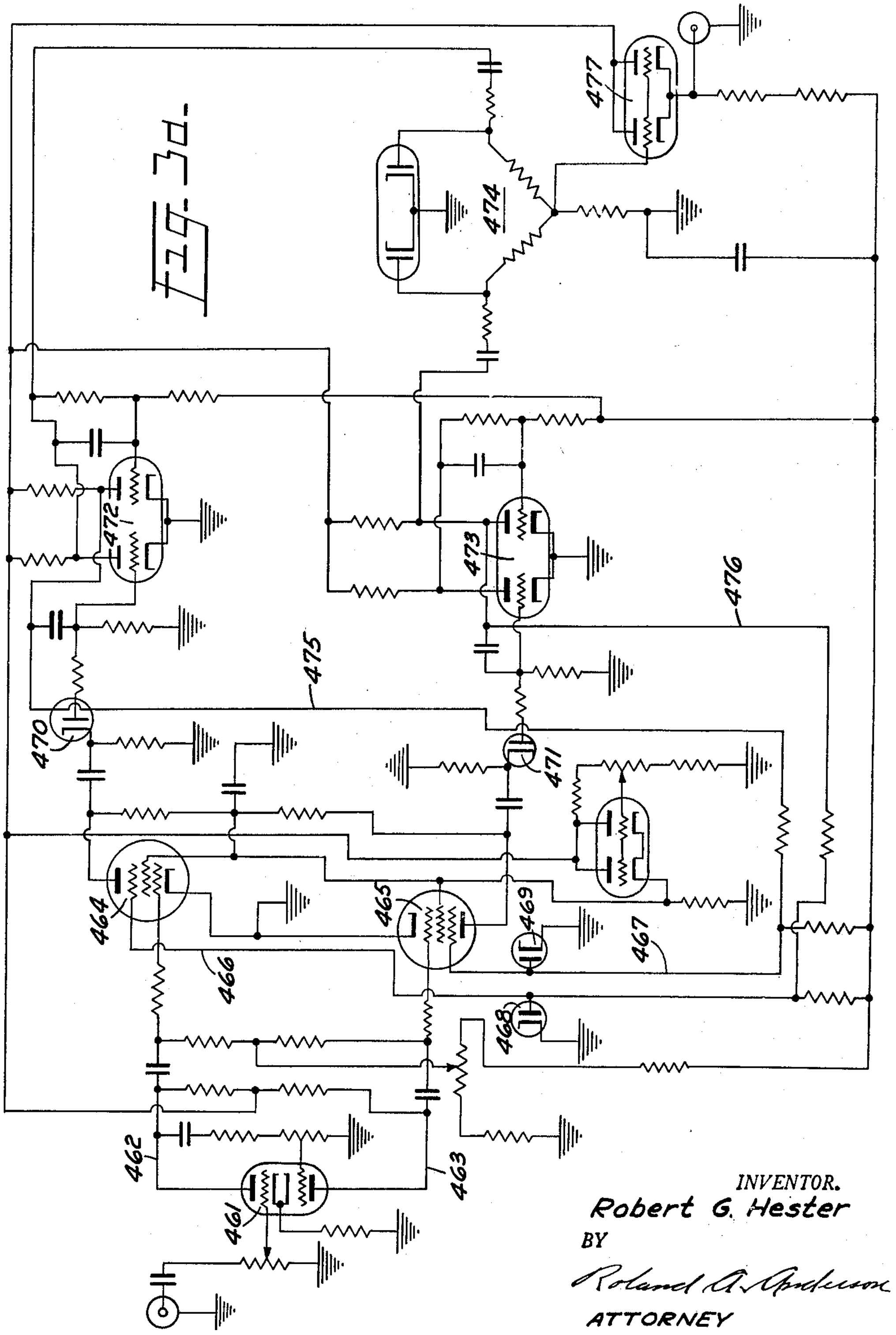
Figure 3B:
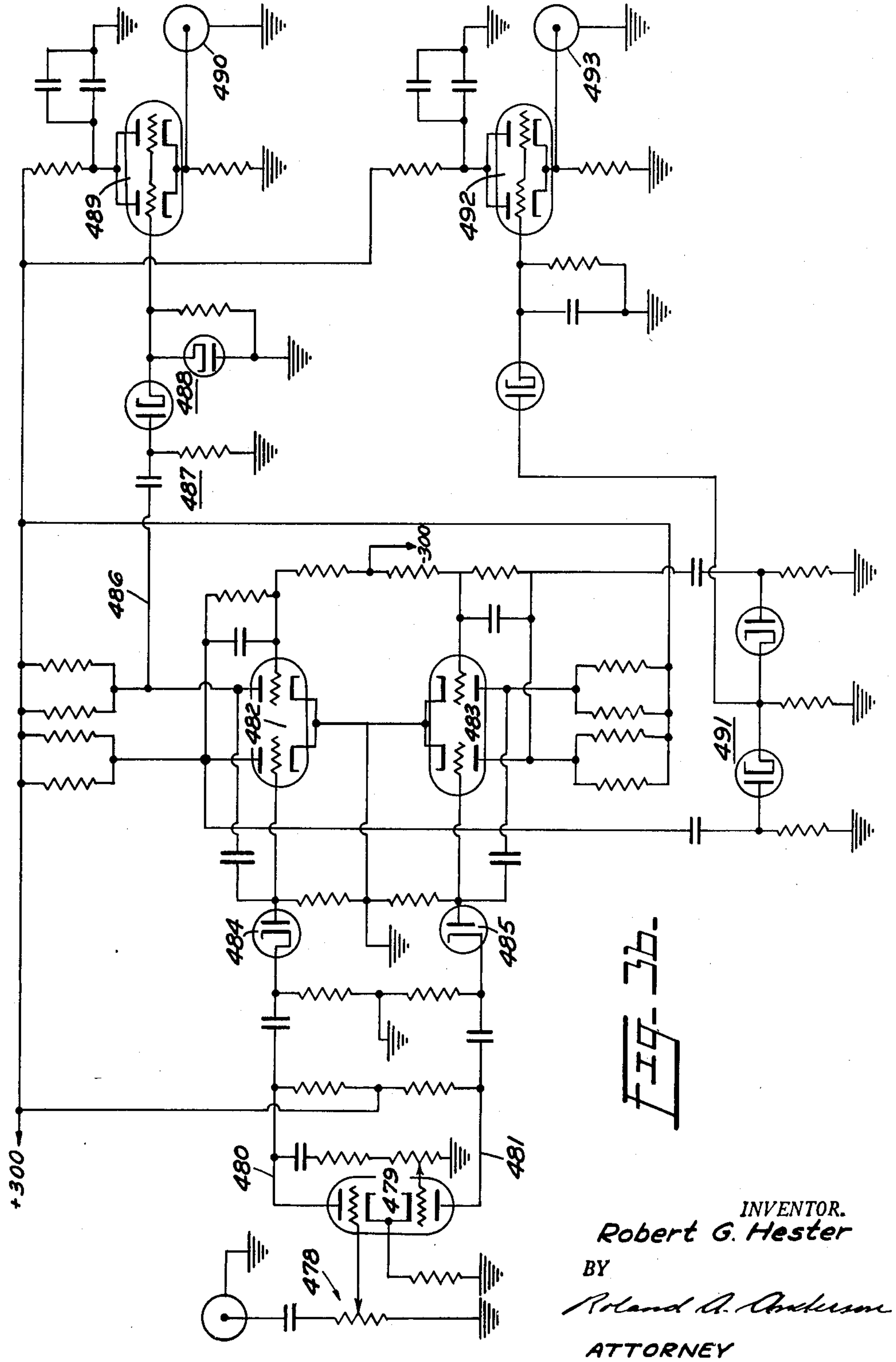

Further objects and numerous advantages of my invention will become apparent from the following detailed description, wherein Fig. 1 of the drawing is a block diagram showing a preferred embodiment of the invention as it may be used in a computing machine;

Fig. 2 represents schematically the wave forms of various signals at selected points along the circuit of Fig.2; and Figs. 3*a* and 3*b* illustrate a detailed schematic diagram of a preferred embodiment of the invention.

In normal operation of a magnetic reading device, when the recording medium passes adjacent the gap in the core of the pick-up head the magnetic flux from a recorded signal on the medium passes through the head.

The magnitude of the flux may first increase to a maximum value, then return to zero as the magnetized region of the recording medium is passed over. If the flux rise time and fall time are approximately equal, then there is induced in the pick-up winding a voltage pulse of one polarity, followed by a second pulse of the opposite polarity and of approximately the same magnitude. The polarity of the first pulse depends upon the flux direction through the head, and this in turn is determined by whether the north or south pole of the recorded signal first passes the core gap. In a computer where binary 1 is recorded by applying a positive voltage pulse to a recording head and binary 0 is recorded by applying a negative voltage pulse, the signal recovered from the memory is a positive pulse followed by a negative pulse for a 1, and a negative pulse followed by a positive pulse for a 0. In illustration, Fig. 2*a* shows the wave form of the signals recovered for a typical binary number 1001, as derived from a magnetic reading-recording head.

Referring now to Fig. 1, coil 6 represents the winding on the pick-up head which scans the record medium. The derived signal pulses may be amplified in a conventional single or three-stage preamplifier 7 and coupled through a cathode follower circuit 8 to the polarity selector, illustrated by blocks 9—27. The latter circuit produces two pulse outputs; the first may be employed as a "shift" pulse for resetting a storage or shift register to zero as each bit of information is read, and the second may be employed as a "signal" pulse for adding a unit to the number in the register only when the input signal is binary 1. In these registers, described more fully in co-pending application Serial Number 277,816 of Stone, Bettis, and Mann, the shift and signal pulses may set concatenated binary counter stages to represent the several digits of the binary number read off the storage medium. The numbers stored in the registers may be gated out for use in a computer or other utilization device as desired.

Signals from follower 8 are impressed on a gain-control potentiometer and delivered to amplifier 9. If the input signal from winding 6 represents binary 1, the two pulses as seen at junction 1 will be first positive, then negative, but at the input to amplifier 9 will be negative, then positive. The signals are amplified and inverted in polarity by amplifier 9, so that lead 2 receives first a positive, then a negative pulse. Since positive pulses may pass through gating device 10, univibrator 11 will be triggered, producing a pair of output pulses, one on lead 4 and the other on lead 16. The signal from lead 2 is also amplified and inverted by amplifier 12, so that lead 3 receives first a negative, then a positive pulse. The negative pulse is rejected by gate 13, so that univibrator 14 does not trip. A positive output pulse from univibrator 11 is delivered to the mixing network 17 on lead 4, and a negative output pulse on lead 16 is fed back to block gate 13. The pulse width of the blocking signal from univibrator 11 is so adjusted that it holds gate 13 non-conducting for the duration of both positive and negative portions of the signal on lead 3, yet it allows the gate to recover during the dead time between signals. The positive output pulse from mixer network 17 may be taken through cathode follower 18 to a further amplifying and phase inversion circuit represented by amplifiers 21, 22. The negative pulse from amplifier 21 is employed to trigger univibrator 23, which produces both positive and negative output pulses. The latter pulse is differentiated, the negative spike is discarded, and the positive spike is delivered to output 20 through cathode follower 27. The positive pulse from univibrator 23 is delivered to mixer 25, the output of which is taken through cathode-follower 26 to output lead 19. The negative pulse from amplifier 21 is also delivered to amplifier 22, where it is inverted in polarity so that it will not trigger univibrator 24. It will be seen that for binary 1, a pulse appears at both outputs 19, 20.

If the input to preamplifier 7 represents binary 0, comprising a first negative pulse, followed by a positive pulse, the two component pulses are inverted in polarity by preamplifier 7, re-inverted by amplifier 9, and again inverted by amplifier 12, so that lead 2 receives first a negative, then a positive pulse, and lead 3 receives first a positive, then a negative pulse. Gate 13 passes the positive pulse to trigger univibrator 14. That circuit produces a pair of outputs; a negative pulse on lead 15, which is coupled to gate 10 in time to block the second or positive part of the pulse on lead 2; and a negative pulse on lead 5. Gate 10 rejects the negative pulse, and then is blocked by the negative pulse on lead 15, so that no pulse is allowed to pass to univibrator 11. Therefore no pulse is delivered on lead 4 to the mixer circuit 17, so that only the negative pulse from lead 5 is passed through to follower 18. The follower drives amplifier 21, which delivers a positive pulse to amplifier 22 and also to univibrator 23. The positive pulse is inverted in amplifier 22 and triggers univibrator 24, producing a positive pulse which is coupled to mixer 25. The positive output of the mixer is taken through cathode follower 26 to output lead 19. Thus, for binary 0, a pulse appears only on output 19, and no pulse appears at output 20. The first stage of the shift register illustrated will be cleared to zero by the pulse from lead 19, and will remain at zero in the absence of a pulse on lead 20.

Typical pulse waveforms at various points of the circuit are illustrated in Fig. 2. The four-digit binary number 1001 read off magnetic tape by a magnetic transducer may produce a sequence of four pulses at junction 1, as shown in Fig. 2*a*. The first and fourth ("1") pulses are initially positive-going voltage alternations, while the second and third ("0") pulses are initially negative-going alternations. The signals after inversion in preamplifier 7 are shown in Fig. 2*b*, and after another inversion in amplifier 9 may assume the wave-form of Fig. 2*c*. The four "shift" pulses produced on lead 19 and used to reset the register are shown in Fig. 2*d*, and the two "1" pulses produced on lead 20 by the initially positive-going alternations are shown in Fig. 2*e*. It will be noted that the "1" pulses of Fig. 2*e* are delayed slightly relative to the corresponding pulse in Fig. 2*d*, so that the register may be cleared before the "1" pulses arrive.

Circuit details of a preferred embodiment of my polarity selector are shown in Fig. 3. Each input signal pair of pulses is differentiated by the capacitor and potentiometer in series with the input terminal, and applied to the grid of a phase inverter stage 461, which may be a 12AU7 type twin-triode having common cathodes, and which may perform the functions of both amplifiers 9, 12 of Fig. 1. The inverter produces two signal alternations in both signal channels 462, 463, the alternations in each channel being of opposite initial polarity. These alternations are again differentiated and coupled to blocking devices or gates 464, 465, which may be pentodes of the 6AS6 type. These gates are adapted to be normally receptive to positive input pulses at their control grids, and intermittently non-receptive to such pulses due to the presence of a negative signal on their suppressor grids. Diode clamps 468, 469, respectively, are coupled to the suppressor grid leads to prevent driving the grids too far positive. Both gates are normally receptive or "open," and the tubes are conducting. The positive spike representing the leading edge of the positive pulse in one of the channels 462, 463, will render the associated gate tube more conductive, producing a sharp negative pulse at its anode, while the negative pulse in the opposite channel will produce a positive pulse at the anode of the other gate tube. After passing through another R-C differentiating network, the resulting pulses are coupled through respective diodes 470, 471 to the input grids of univibrators 470, 472. Due to the polarity of the diode coupling, only the negative pulse will pass to trigger the univibrator. After a suitable delay, the selected univibrator produces a square-wave output signal, which is coupled to mixing network 474, then returns to its stable condition. The mixer may comprise 3 resistances connected in a Y arrangement, with two arms coupled to receive inputs, the third arm connected to ground, and shunting diodes provided across the signal-receiving arms. A negative pulse output is taken from the triggered univibrator on the respective one of leads 475, 476, and coupled back to block the gate in the opposite channel. Thus, circuit 472 is connected through lead 475 to the suppressor grid of gate 465, while circuit 473 is coupled to the suppressor grid of gate 464 through lead 476. In this manner, the gate which first received a negative pulse is blocked as a result of the first input pulse to the opposite gate, before the second or positive of the two input pulses associated with each bit of recorded information can pass therethrough, and for a time long enough to allow the said second pulse to decay until it is no longer in the input circuit to the blocked gate. The suppressor grid of that gate will recharge through the plate resistor of the univibrator from which the blocking signal was derived, so that before the next set of two input pulses is received at the gate, the latter is "open" again.

It may be seen from the above description that only one of the univibrators will be triggered for each input set of two pulses, and that the polarity of the first of those pulses determines which one will be triggered. If circuit 473 is triggered, a negative pulse will appear at the input of follower 477, which is coupled to the junction of the Y-connected resistors in mixer 474, but if circuit 472 is triggered, a positive pulse will appear at the input. The resulting output pulse, of the same polarity, is differentiated in R-C coupling network 478 and applied to another phase inverter 479. Pulses of opposite polarity will then appear in channels 480, 481, and those channels are coupled through R-C differentiating circuits and diodes 484, 485, to the input circuits of univibrators 482, 483, respectively. Only the univibrator coupled to the channel receiving the negative pulse may be triggered, because of the polarity of coupling diodes 484, 485.

If a positive pulse is delivered to network 478, a negative pulse will appear on lead 480 and will be coupled through diode 484 to univibrator 482. Circuit 482 is tripped, and the resulting negative square wave in output channel 486 is differentiated into negative and positive spikes in network 487. The positive pulse is passed but the negative pulse is removed by series-parallel diode clipping network 488, and the positive pulse is coupled to a cathode-follower output stage 489. The output in channel 490 will therefore be a positive pulse corresponding to each positive pulse at the input circuit 478, which pulse corresponds, in turn, to each group of two pulses appearing at input stage 461 wherein the first pulse is negative, indicative of binary 0.

The anode of the input tube of each of univibrators 482, 483 is coupled to a second mixer network 491, and that network is coupled to follower 492, so that a positive pulse from one of the univibrators is impressed upon the follower grid regardless of which circuit is triggered. Therefore, a positive pulse will appear in output channel 493 for each set of two input pulses at input stage 461. The pulses in channel 490 will be delayed wtih respect to those in channel 493 by the time between the leading edges of the pulses generated at the anodes of the two tubes forming univibrator 482.

If a negative pulse is delivered to network 478, a positive pulse will appear in channel 480, while a negative pulse will appear in channel 481. The latter will pass diode 485 and trigger univibrator 483. The resulting positive signal is delivered to mixer 491, actuating cathode follower 492 to produce a positive pulse at output 493. But since univibrator 482 is not triggered because the positive pulse in channel 430 will not pass diode 484, no pulse output appears at output 490.

Therefore the illustrated embodiment of my invention produces a pulse at a first output corresponding to the receipt at its input of each binary character, a group of two pulses, and produces a pulse at a second output corresponding to receipt at its input of only a preselected one of said characters.

Having described my invention, I claim:

1. A polarity selector circuit having a single input and first and second outputs comprising means for receiving a sequence of electrical pulses representative of binary characters at said input; first means for deriving first and second pulses of opposite polarity from each of said received pulses; first and second circuit devices having a stable and an unstable state; respective pulse gating circuits interposed between said first means and said circuit devices to selectively pass said derived pulses; means for deriving an output pulse from the one of said circuit devices receiving a derived input pulse of a selected polarity as said one device assumes its unstable state; means for deriving a blocking pulse from said one circuit device for temporarily blocking the gating circuit associated with the opposite circuit device; common circuit means coupled to both of said circuit devices for receiving said output pulses therefrom; means for deriving third and fourth pulses of opposite polarity from said common circuit; third and fourth circuit devices having a stable and an unstable state coupled to said last named means for receiving respectively said third and fourth pulses; means for deriving an output pulse from the one of said third and fourth circuit devices receiving an input pulse of a selected polarity; circuit means coupling said pulse derived from said third device to said first output; circuit means coupled to said third and fourth circuit devices for mixing said output pulses derived from said third and fourth circuit devices; and means for impressing said mixed output pulses on said second output.

2. A polarity selector circuit of the character described having a single input channel and a pair of output channels and comprising a phase inverter including an input circuit and a pair of output circuits and adapted to reproduce pulse pair input signals at one of said output circuits and to reproduce input signals with polarity inversion at the other output circuit; first and second gating circuits coupled to respective output circuits; first and second univibrator circuits having a stable and an unstable state coupled to respective gating circuits and adapted to be triggered by pulses therefrom; feed-back means for blocking each of said gating circuits responsive to the triggering of the univibrator connected to the opposite gating circuit; means for mixing the pulse outputs of said univibrator circuits to produce a first signal pulse; a second phase inverter having an input circuit and a pair of output circuits coupled to receive said signal pulse; third and fourth univibrators coupled respectively to the outputs of said second phase inverter; means coupled to said first output channel for deriving a signal from the triggering of said third univibrator; means for deriving respective signal pulses from said third and fourth univibrators; and means for mixing said signal pulses to produce a pulse of a selected polarity only in said second output channel.

3. A reading device for recorded magnetic signals including a magnetic pick-up head for deriving a voltage pulse of one polarity followed by a second pulse of opposite polarity from a bit of recorded information, comprising: a first amplifier having input and output circuits and coupled to receive said pulses from said head; a second amplifier having input and output circuits, and coupled to the output circuit of said first amplifier, for receiving and inverting the polarity of said pulses; first and second gate circuits coupled respectively to said first and second amplifier circuits for receiving pulses therefrom; first and second mono-stable circuits coupled respectively to the output of said gate circuits and adapted to produce respective output pulses responsive to a triggering pulse from the output of said gate circuits; means for blocking each of said gate circuits responsive to the actuation of that mono-stable circuit coupled to the opposite gate; mixer means coupled to receive an output pulse from the triggered mono-stable circuit and to produce a first signal pulse therefrom, each pulse therein corresponding to the binary character of one of said bits of recorded information; a third amplifier circuit coupled to receive said signal pulse from said mixer means; a fourth amplifier circuit coupled to the output of said third amplifier circuit for inverting the polarity of the pulses therefrom; third and fourth mono-stable devices connected respectively to and adapted to be triggered by the outputs of said third and fourth amplifier circuits; means for deriving a first output pulse from the triggering of said third mono-stable device; means for deriving respective pulses from said third and fourth mono-stable devices; and means for mixing said respective pulses to produce a second output pulse; said first output pulse being indicative of a selected recorded bit of information, and said second output pulse being indicative of each recorded bit of information.

4. In a polarity selector circuit of the character described, circuit means responsive to each input pulse for producing corresponding pulses of opposite polarity in a pair of signal channels, a pair of gating circuits adapted to be blocked or unblocked by respective gating voltages and respectively coupled to said channels to receive said produced pulses; first and second monostable trigger circuits adapted to be triggered alternatively to an unstable state by an output pulse of a selected polarity only from said gating circuits, means for deriving said gating voltages for each gating circuit from actuation of said trigger circuit in the opposite signal channel, and circuit means for deriving alternatively a positive pulse from said first trigger circuit or a negative pulse from said second trigger circuit when one of said trigger circuits is actuated by a pulse of said selected polarity, the polarity of said derived pulses being indicative of the polarity of said input pulse.

References Cited in the file of this patent

UNITED STATES PATENTS

| | | |
|---|---|---|
| 2,600,919 | Pritchard | June 17, 1952 |
| 2,609,143 | Stibitz | Sept. 2, 1952 |
| 2,633,402 | Fleming | Mar. 31, 1953 |
| 2,700,149 | Stone | Jan. 18, 1955 |